United States Patent [19]

Wingen

[11] 4,063,723
[45] Dec. 20, 1977

[54] SPLINE ELEMENT FOR SEAT IN A VEHICLE

[75] Inventor: Wilhelm Wingen, Feldkirchen, Germany

[73] Assignee: Fritzmeier AG, Lenzburg, Switzerland

[21] Appl. No.: 725,336

[22] Filed: Sept. 21, 1976

[30] Foreign Application Priority Data

Sept. 22, 1975 Germany ............................ 2542182
Nov. 27, 1975 Germany ............................ 2553410

[51] Int. Cl.² ............................................. F16F 9/06
[52] U.S. Cl. ................................... 267/131; 188/300; 248/354 H; 267/34; 267/64 R; 297/345
[58] Field of Search ............... 267/8 R, 64 R, 65 R, 267/34, 113, 120, 121, 124, 131, 133; 188/300, 312, 317, 319; 248/188.2, 354 H, 399, 400; 297/345, 355

[56] References Cited

U.S. PATENT DOCUMENTS

| 2,980,418 | 4/1961 | Doetsch .............................. 267/34 |
| 3,177,981 | 4/1965 | Porter ................................. 188/300 |
| 3,447,645 | 6/1969 | Dorner et al. ............... 248/354 H X |
| 3,787,019 | 1/1974 | Freitag ....................... 248/354 H X |
| 3,979,109 | 9/1976 | Ishida .............................. 267/64 R |

*Primary Examiner*—Johnny D. Cherry
*Attorney, Agent, or Firm*—Oblon, Fisher, Spivak, McClelland & Maier

[57] ABSTRACT

The present invention involves a spline element for a seat in a vehicle, in which the height of the seat can be adjusted without changing the spline initial stress, and wherein the initial stress of the spline can be adjusted without making a change in the height of the seat. This is achieved by means of a cylinder which provides an enclosed gas compression compartment against which a pair of pistons disposed at opposite ends of the cylinder can be adjusted from each end thereof. Each piston has flow channels provided therethrough which can be closed with the aid of a respective back stroke valve which can be set in motion at any time from the outside, thereby turning the piston into a floating piston.

8 Claims, 3 Drawing Figures

SPLINE ELEMENT FOR SEAT IN A VEHICLE

BACKGROUND OF THE INVENTION

1. Field of the Invention

The present invention relates generally to an improved spline element for a seat in a vehicle, which can be adjusted in its height and in its load weight.

2. Description of the Prior Art

In the case of spline elements known heretofore, it is necessary for the driver to remove the pressure from the seat in order to adjust the seat for different weights of the driver. Otherwise, it is not possible to adjust the seat because of the strong counter pressure.

SUMMARY OF THE INVENTION

Accordingly, it is an object of the present invention to provide a spline element with which it is possible, on the one hand, to adjust the height without affecting the cushioning of the seat and, on the other hand, to adjust the spring resistance to the person occupying the seat at that time without it being necessary for the person to leave the seat.

The foregoing object and others as well are achieved through the provision of an operational cylinder having an enclosed gas pressure compartment against which opposing pistons can be adjusted at the same time from both ends. Both pistons are equipped with through flow channels leading to respective non-return valves which block such flow from the rear side of the pistons. One of the pistons forms a height adjusting piston, and the rod of this piston leads from the cylinder as a support end of the spline element. The back stroke valve of this cylinder can be operated directly from the outside by means of a tappet which acts axially on the piston rod. The other piston operates as a floating piston. Its back stroke valve can be operated against the resistance of a spring bolt through a weight adjusting piston, which can be brought in by evening the pressure on both sides against the floating piston. The back stroke is limited mechanically by the floating piston. This weight adjusting piston forms the other prop end of the spline element by the piston rod which comes out of the operational cylinder. The spline of this element rests against the prop end and the operational cylinder. In this arrangement, the necessary initial stress is created in the spline for the given weight of the driver by the weight itself of the driver. In the splining of the weight adjusting piston, the floating piston slides in the spline and is held there in that position. In this way, the spline holds the maximum possible stroke of the weight adjusting piston, and also allows variations of the stroke in the area of the dynamic loading of the seat on a rough road. On the other hand, when the pressure on the seat is relieved under the existing initial stress, the spline element is returned without any difficulty to the initial position within the appropriate time period. In this initial position the closing valve of the floating piston opens as a result of the pressure of the pressure gas located behind the weight adjusting piston in the area between the floating piston and the given piston, and in this way the floating piston takes care of evening the pressure. As a result, the floating piston is brought back to the initial position with the help of the weight adjusting piston. The initial stress of the spline element resulting from the loading of the seat conditions the shortening of this element, which can be balanced with the help of the height adjusting piston to provide for the need of the driver at the time. During this time, the driver merely operates the back stroke valve of the piston, and, as a result, the height adjusting piston, which operates as a differential piston, can be driven out under the pressure of the pressure gas.

In order to bring the floating piston back to the initial position, the spring bolt is designed in such a way that it provides for a very slight opening of the valve with the simultaneous pressure of the spline of the spline element. The valve itself, however, can be made of porous sintered steel, so that, as a result, the pressure is relieved through the valve itself by the differential pressure in the gas compartment on both sides of the valve. The weight adjusting piston operates at the same time through the boreholes which pass through it as a damping element, so that the reciprocal movement of this piston is dampened within the area of displacement of the floating piston.

In principle, the operational cylinder can also be designed as an independent element, regardless of the spline element of a seat of a vehicle.

There are types of vehicles with regard to which it occasionally is not desirable to have spring suspensions on the seats of the vehicle in connection with the operation of the vehicle, as when it is required that the driver has firm contact with the vehicle. This applies, for example, in the case of charting equipment, as well as with regard to certain military vehicles. In order to establish firm contact, that is, a position without springs, the only thing which is necessary, according to the invention, is to arrange for the throttle valve to be locked by means of a locking valve, which can be set in the locked position from the outside with regard to the active tappet which passes through the piston rod of the weight adjusting piston. By means of the combination of the weight adjusting piston with a locking valve passing therethrough, it is possible to lock the seat in a simple way, and especially it is possible to lock the seat and set the height of the seat without any locking by stages over the entire course of the spline. Basically, the valve remains in an open position during normal operation of the suspension springs, so that the pressure gas can pass through freely. As soon as the pin of the locking valve is released, that is, as soon as it is closed by the pressure of the pressure gas, it is not possible to withdraw the gas which is located behind the weight adjusting piston.

In the case of changing of the oil used as a dampening medium, one must provide for a separation piston between the oil and the gas, that is, between the height adjusting piston and the floating piston. It turns out that by using oil as the dampening medium, in relation to the small diameter of the piston, one can get a substantially higher quality of damping and a shorter response period.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference numerals designate like or corresponding parts, and wherein.

DETAILED DESCRIPTION OF THE PREFERRED EMBODIMENTS

Figure 1:
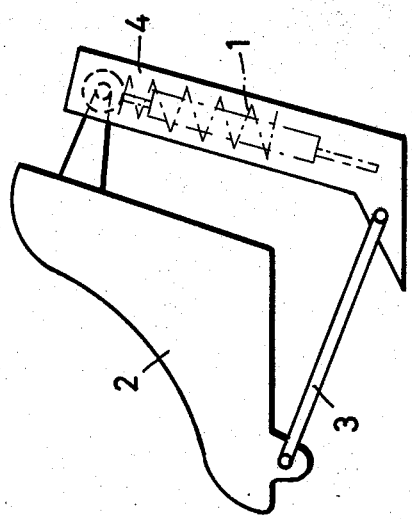
FIG. 1 shows, in the form of a diagram, a seat of a vehicle with a spline element according to the present invention.

Referring now to the drawings and more particularly to FIG. 1, a spline element 1, according to the present invention, is shown in application to a seat of a vehicle. The body 2 of the seat itself is connected with the spline element on the bottom side thereof by a pinion 3 and on the back side thereof by a guide bar 4 for straight line movement upwards and downwards.

Figure 2:
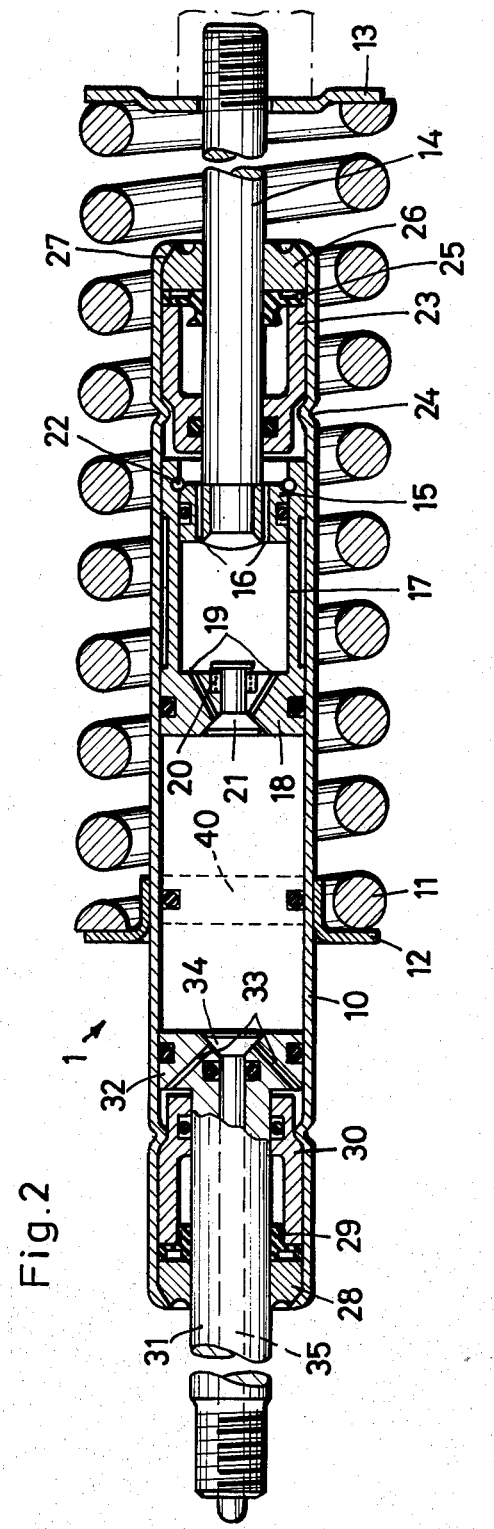
FIG. 2 shows an axial cross section through the spline element according to the present invention.

The spline element 1 is supported at its upper end on the body of the seat 2 and at the lower end on the guide bar. It consists of an operational cylinder 10 which, as shown in FIG. 2, forms the support of a screw spring 11 which determines the spring resistance of the seat. The screw spring 11 is the main spring, being supported at the one end by an abutment 12 fastened on the cylinder 10 and at the other end on a spring plate 13, which in turn is propped by a piston rod 14 of a weight adjusting piston 15 which moves in the operational cylinder and serves for adjusting the weight. This piston 15 has operational boreholes 16, in the form of throttle channels, which connect its front side and rear side and serves for evening the pressure as well as for damping the movement when the fluid medium contained within the cylinder 10 passes therethrough. The piston 15 is disposed within a cylindrical apron 17 formed on the rear side of a floating piston 18, in which there are formed through flow passages 19. These passages can be closed or locked by means of a valve pin 21, which stands under the pressure of a locking spring 20. The apron 17 has a lug 22 on its end facing the tip of the piston 15. The lug is designed as a spring ring for the weight adjusting piston 15, which can be brought under the pressure of the screw spring 11, being held within the enclosure of the floating piston 18 by the lug 22, all the way to a guide plug 23 disposed in the end of the cylinder 10. The plug 23 serves as the limit lug for the floating piston, as well as a guide for piston rod 14, and is fastened at the end of the cylinder by an inward indentation thereof, or a throttle 24, on the side facing into the cylinder, and on its other side by a sealer 25 which seals the piston rod 14 and the operational cylinder 10. The closure of the operational cylinder 10 constitutes a closing plug 26 which is located in the other side of this sealer 25. This plug is fastened by a flange 27 of the operational cylinder.

At the other end of the operational cylinder 10 there is located a corresponding group of a locking plug 28, a sealer 29, and a limit stopper 30, which jointly seal and control a piston rod 31, which is firmly connected with a piston 32 disposed within the cylinder 10. The piston 32 serves for height adjustment of the seat and functions as a differential piston. The front and rear sides of the height adjusting piston are connected by boreholes 33, which can be closed or locked by a valve pin 34. The valve pin 34 can be adjusted by means of a tappet 35, which extends axially through the piston rod 31. The tappet is of one piece construction in the given case involving the use of a valve pin and is framed by the piston rod 31 and is adjustable mechanically from the outside.

Gas under high pressure is contained in the operational cylinder. The effect of the gas is that the valve pin 34 of the height adjusting piston is maintained in a closed position with a high force determined by the cross section of the tapet and does not need a lock spring.

In the given example, according to FIG. 1, the piston rod 31 is propped against the body of the seat at the guide rod 4 and the piston rod 14 is arranged therein in a downward extending direction. In order to adjust the height of the seat, the valve pin 34 is lifted from its place by the tappet 35 with the help of a device which is not presented here, for example, with the help of a hand lever with a corresponding transmission gear, and, as a result, the height adjusting piston is displaced in the operational cylinder. If one closes the valve pin 34 again, after the desired height of the seat is reached, the height adjusting piston 32 remains in that position, and the gas pressure against the front and rear side of the piston is even in that case. This adjustment has no impact on the spring cushioning of the body of the seat 2, because the screw spring 11 is propped against the operational cylinder.

The screw spring 11 is selected in such a way that it remains under expanding initial stress when the seat is not occupied, which means that the screw spring 11 is still not relieved of pressure at the apron 17 adjacent to the guide plug 23 and the weight adjusting pin adjacent to the spring ring. When the seat is occupied, the weight adjusting piston 15 is pressed in the operational cylinder through the rod 14. Since its boreholes 16 are open, the piston slides against the exclusive resistance of the screw spring 11 in the direction of the floating piston 18, and, as a result, the pressure gas found in the sleeve of the floating piston, which is to be displaced, flows to the rear side of the weight controlling piston 15. When the load is sufficiently heavy, that is, when the apron 17 is under full pressure, the weight adjusting piston 15 reaches the valve pin 21 and moves it against the biasing pressure of spring 20 and thus opens it, thereby assisting the floating piston 18, the valve pin 21 of which closes automatically when pressure is relieved from the weight controlling piston, and this piston then remains in this displaced position, as long as the weight oscillations of the seat occupied by a person do not cause any major piston displacement, for example when the road is rough, since the piston is held by the stroke between the spring ring 22 and the head of the floating piston 18. When the person gets out of the seat, the weight adjusting piston 15 runs, under the pressure of the screw spring 11, against the spring ring 22 and returns slowly the floating piston to its initial position. As a result, the gas located behind the weight adjusting piston 15 penetrates through the boreholes 16 into the apron 17, and, as a result, the valve pin 21 of the floating piston 18 opens against the force of the lock spring 20. The lock spring 20 of the valve pin 21 needs to be exposed only to such an extent that the valve opens under the pressure of the gas from the rear side of the weight controlling system or piston 15 to its front side, in order to guarantee the return of the floating piston 18 and of the weight adjusting piston 15 to the initial position of the unoccupied seat. Besides, the pressure on both sides of the floating piston is balanced by static load so that, as a result of the static pressure of the pressure gas, no force is exercised on the stop valve of the floating piston, because the small surfaces are the same on both sides of the valve pin. The lock spring can also be built heavier, in which case the front part of its valve pin is made, for example, from porous sintered metal, by which it is possible to even the pressure during the return movement. During the return movement of the floating piston to its initial position, the required balancing of the pressure and exchange of the gas should be delayed in such a way that, within the framework of normal load oscillations, no adjustment takes place. A return movement within a period of about 20 seconds seems appropriate, so that when there is a change of the driver, and therefore a change of the category of weight of the driver, there can be a continuous new adjustment to this weight class.

As a result of the movement of the floating piston 18 under the weight of the occupier of the seat, the initial stress of the screw spring 11 is maintained for the user while the seat is used, so that the movement area of the weight adjusting piston 15 is limited by the head of the floating piston and by the lug 22. In order to compensate for the shortening of the spline element caused by this initial stress of the screw spring 11, the driver can set in motion the height adjustment to move the height adjusting piston. When the valve pin 33 is manually released, a force in the direction of the extension of the spline element will operate the seat of the driver under the pressure of the gas against the differential surfaces of the height adjusting piston. As a result, the desired height of the seat can be reached with the minimum loading pressure or relief of pressure on the seat.

In case the height adjustment through the height adjusting piston is not needed, according to the invention, the piston can be left out, and the corresponding end of the cylinder can be built as a closed end. The weight adjustment takes place independently of the height adjustment.

Figure 3:
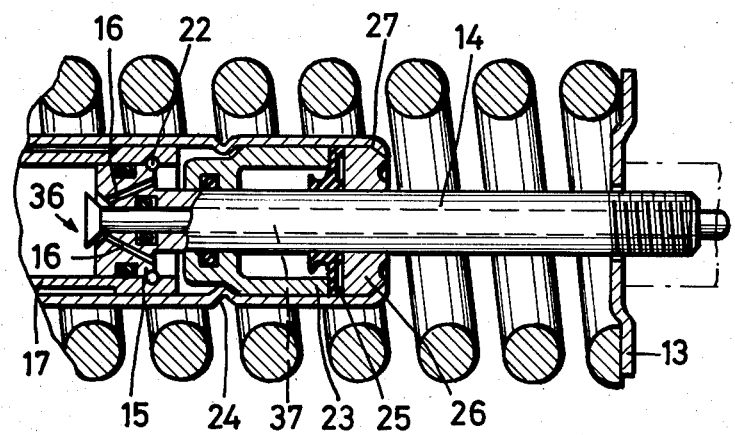
FIG. 3 shows a modified version of a spline element.

In case of the design shown in FIG. 3, the throttle boreholes 16 of piston 15 can be closed with the help of a lock valve 36, which can be stopped in a locking position by a tappet 37 which can be put in motion from the outside and projects past the piston bar 13. Basically, the lock valve 36 remains in the open position under normal action of the spring mechanism, so that the pressure gas can flow through freely. As soon as the valve pin closes the lock valve, for example, by being released from the outside and under the pressure of the gas, or by forced closure from the outside, it is not possible to balance the gas located behind the weight adjustment piston, so that the weight adjusting piston 15 remains in its position and, as a result, the spring mechanism is blocked. This can be an advantage for the appropriate operational procedure in the handling of the vehicle.

If oil is used as the damping medium, a separating piston 40 is set up between the floating piston 18 and the height adjusting piston 32, as shown in phantom in FIG. 2. This piston forms a gas pressure compartment between itself and the height adjusting piston and between itself and the floating piston, and behind that compartment it separates the oil compartment.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A spline element for a seat of a vehicle, which can be adjusted according to the height and weight load, comprising:
   an operational cylinder defining an enclosed pressure gas compartment;
   a pair of pistons adjustably disposed within said cylinder adjacent opposite ends thereof;
   each of said pistons being equipped with through flow channels leading from the gas compartment to the opposite sides of said pistons;
   a locking valve for each of said pistons which can close the flow channels on the rear side of the respective piston.
   one of said pistons forming a height adjusting piston and having a rod which leads from the operational cylinder as a stop end of the spline element, its locking valve being operable from the outside by a tappet which extends in the axial direction through the piston rod;
   the other of said pistons being formed as a floating piston, its locking valve being operable against the resistance of a lock spring by a weight adjusting piston which, under even pressure on both sides, can be inserted against the floating piston;
   means on said floating piston for mechanically limiting the return stroke of said weight adjusting piston;
   the other stop end of the spline element being formed by the piston rod of said weight adjusting piston which is drawn out of the operational cylinder; and
   a spring of the spline element being propped by said other stop end and by the operational cylinder.

2. A spline element as described in claim 1, wherein said floating piston further comprises a cylindrical apron on its rear side, and said weight adjusting piston and said means for limiting the stroke thereof form a stop valve of said floating piston.

3. A spline element according to claim 1 wherein said weight adjusting piston is equipped with throttle boreholes connecting its front and rear sides.

4. A spline element according to claim 3, further comprising valve means for closing said throttle boreholes of said weight adjusting piston, 5. A spline element according to claim 1 wherein said spring of said spline element is a screw spring which encloses the operational cylinder.

6. A spline element according to claim 1 wherein, when the seat of the vehicle is not occupied, said floating piston is drawn back to its initial position by said weight adjusting piston.

7. A spline element according to claim 6, wherein said locking valve of said floating piston consists of porous sintered metal. being in the form of a tappet operable from the outside and being encompassed by said piston rod of the weight adjusting piston.

8. A spline element according to claim 1, further comprising a separation piston disposed between said floating piston and said height adjusting piston for delimiting an oil compartment from the gas compartment on the side of the floating piston.

* * * * *